United States Patent [19]

Schaal et al.

[11] Patent Number: 5,628,048
[45] Date of Patent: May 6, 1997

[54] PROCESS FOR OBTAINING URANIUM TRIOXIDE BY DIRECT THERMAL DENITRATION OF URANYL NITRATE

[75] Inventors: Gilbert Schaal, Narbonne; Robert Faron, Courbevoie, both of France

[73] Assignee: Comurhex Societe Pour La Conversion De l'Uranium En Metal Et Hexafluorure, Velizy-Villacoublay, France

[21] Appl. No.: 586,879

[22] PCT Filed: Jun. 12, 1995

[86] PCT No.: PCT/FR95/00765

§ 371 Date: Feb. 28, 1996

§ 102(e) Date: Feb. 28, 1996

[87] PCT Pub. No.: WO95/34508

PCT Pub. Date: Dec. 21, 1995

[30] Foreign Application Priority Data

Jun. 13, 1994 [FR] France .................. 94 07189

[51] Int. Cl.$^6$ .................................. C01G 43/01
[52] U.S. Cl. .......................... 423/260; 423/19
[58] Field of Search ........................ 423/260, 19

[56] References Cited

U.S. PATENT DOCUMENTS

| | | | |
|---|---|---|---|
| 2,981,592 | 4/1961 | Lawroski | 23/14.5 |
| 3,041,136 | 6/1962 | Hedley et al. | 23/14.5 |
| 4,399,106 | 8/1983 | Ueda | 422/140 |
| 4,585,634 | 4/1986 | Bachelard et al. | 423/260 |
| 4,687,601 | 8/1987 | Bachelard et al. | 423/260 |

OTHER PUBLICATIONS

"Production of Uranium Dioxide by Flame Denitration", W. H. Hedley et al., vol. 3, No. 1, Jan., 1964, I&EC Process Design and Development, pp. 11–14.

Patent Abstracts of Japan, vol. 7, No. 28 (C–149), 4 Feb. 1983 & JP A 57 183327 (Mitsubishi Kinzoku).

Proceedings of the International Symposium on Fluidization, 6 Jun. 1967 Eindhoven, pp. 769–781, Rodrigo Otero, "Fluidized Bed Calcination of Uranyl Nitrate Solutions".

*Primary Examiner*—Edward A. Miller
*Attorney, Agent, or Firm*—Pearne, Gordon, McCoy & Granger

[57] ABSTRACT

Process for obtaining uranium trioxide from a uranyl nitrate solution, the trioxide obtained having to have a specific surface between 12 and 15 $m^2/g$, consisting of producing in a zone of the reaction chamber called the contact zone, a thermomechanical contact between the uranyl nitrate solution, atomized into fine droplets according to a given axis in the contact zone, and a gaseous fluid introduced into the contact zone, the gaseous fluid being at a sufficiently high temperature and having a sufficiently high mechanical energy to carry out, within the contact zone, the dehydration and calcination of the uranyl nitrate.

9 Claims, 2 Drawing Sheets and reduction with the flame of aqueous uranyl nitrate into uranium dioxide. The
PROCESS FOR OBTAINING URANIUM TRIOXIDE BY DIRECT THERMAL DENITRATION OF URANYL NITRATE The present invention relates to a process for obtaining uranium trioxide from uranyl nitrate by the thermal decomposition of hexahydrated nitrate.

In its fuel cycle, uranium can pass through the compound $UF_4$, which is used for two purposes. Uranium tetrafluoride makes it possible to produce metal uranium for the supply of natural uranium reactors. It also makes it possible to obtain the hexafluoride $UF_6$, which is the supply material for gaseous diffusion or ultracentrifuging-based enrichment plants.

The conversion of uranium into $UF_4$ requires a purification stage because the uranium concentrates supplied to the refining plants still contain many impurities. During this purification stage, the uranium concentrate is dissolved in nitric acid in order to give an impure uranyl nitrate, which is purified by tributyl phosphate (TBP). The TBP makes it possible to extract pure uranyl nitrate from the acid solution.

Once in the possession of pure uranium in the nitrate state in aqueous solution, its solid form must be restored in order to transform it, in accordance with the dioxide needs, into tetrafluoride or metal. As the uranium is at valency VI, the necessary intermediate will be the trioxide $UO_3$. By reduction it is then possible to pass to $UO_2$ and by hydrofluoric acid action $UF_4$ is then obtained.

There are two means for passing from the uranyl nitrate in solution to the oxide $UO_3$. A first means consists of adding ammonia in order to obtain by precipitation ammonium diuranate (ADU), which is thermally decomposed into $UO_3$. A second means consists of thermally decomposing the uranyl nitrate after dehydration.

The oxide $UO_3$ does not have the same properties when obtained by the first or second means. The first means leads to a very reactive oxide, i.e. having a specific surface of approximately 15 $m^2/g$. The second means leads to an only slightly reacting oxide, whose specific surface is 1 to 2 $m^2/g$.

The compound $UF_4$ can be obtained from the oxide $UO_3$ by different processes. One particularly interesting process is that using a fluid bed or FB furnace. This furnace, which combines a reduction furnace and a hydrofluorination furnace, makes it possible to successively perform two reactions. Firstly the oxide $UO_3$ reacts hot with the thermally cracked ammonia in order to be reduced to the oxide $UO_2$, which is then contacted with counter-current-injected, gaseous hydrofluoric acid. On leaving the furnace the compound $UF_4$ is obtained. The particular arrangement of the top or head of the hydrofluorination furnace makes it possible to bring about a displacement of the equilibrium reaction by progressively lowering the temperature and consequently the hydrofluoric acid is integrally absorbed. Among the advantages of this furnace reference can be made to the elimination of the hydrofluoric acid excess, which will no longer appear in the effluents.

The FB furnace is an effective apparatus provided that it is supplied with the most reactive possible oxide $UO_3$. A uranium trioxide having a specific surface between 12 and 15 $m^2/g$, on leaving the furnace, gives a product having satisfactory characteristics. Typically this product will have the following composition: 96% $UF_4$, 2% $UO_2$ and 2% $UO_2F_2$. When treated in a flame reactor in the presence of fluorine, it will give a uranium hexafluoride having a satisfactory quality.

Thus, the FB furnace must be supplied by an oxide $UO_3$ of adequate reactivity. For example, an oxide $UO_3$ with a specific surface of 5 $m^2/g$ leads to the production of a uranium hexafluoride which does not comply with industrial standards. Under these conditions the FB furnaces have hitherto been supplied by oxide $UO_3$ obtained by the first means, i.e. that using ammonia for obtaining ammonium diuranate by precipitation.

However, this solution suffers from a number of disadvantages. On the one hand it requires the consumption of ammonia. On the other the precipitation reaction also supplies in large quantities a second compound constituted by ammonium nitrate. For example, for an annual production of 10,000 t of uranium, 4,500 t of ammonium nitrate are also produced. Up to now this ammonium nitrate has been sold as fertilizer, but as it is a byproduct of the nuclear industry, it is very possible that within the next few years, although it only contains a few ppm of uranium, it may no longer be marketable.

The problem which then arises for the purpose of being able to continue to use FB furnaces, which are entirely satisfactory, is to find a process for obtaining highly reactive $UO_3$ (i.e. with a specific surface between 12 and 15 $m^2/g$), which does not produce byproducts. In addition, this process must not consume other compounds and in particular not ammonia.

As indicated hereinbefore, the second known means for passing from uranyl nitrate in solution to the oxide $UO_3$ leads to a product which cannot be used for FB furnaces. The thermal decomposition of uranyl nitrate requires energy in the form of heat, but no reagent. This process makes it possible to recover nitric acid by recombining nitrous vapours with steam resulting from the dehydration. It consists of two stages, namely the evaporation of the solution until the hexahydrated salt $UO_2(NO_3)_2$, $6H_2O$ is obtained and the decomposition of the nitrate at about 500° to 600° C. or denitration.

The applicant has carried out research to attempt to improve the denitration stage in order to obtain a trioxide which is sufficiently reactive to then be treated in a FB furnace. The fundamental mechanisms of the thermal denitration of a hexahydrated uranyl nitrate for obtaining a highly reactive $UO_3$ have been studied. Under the gentle conditions adopted involving kinetics of slow reactions, it would appear that the reactivity of $UO_3$ is directly correlated with the partial water pressure prevailing above the solid. A low partial pressure at low temperature permits the necessary decoupling between the dehydration and calcination stages. The "active" laminated structure of $UO_3$ is already formed at the time of dehydration, whose end (passing of dihydrated uranyl nitrate to the anhydrous state) is determinative and must be carried out with care, otherwise the well structured dihydrate will dissolve in its crystal water.

A pilot apparatus has been produced on the basis of these results. However, the complexity and costs of the installation have been such that it has been decided not to exploit it industrially.

In addition, U.S. Pat. No. 3,041,136 filed on Aug. 4, 1960 discloses a process for the denitration and reduction with the flame of aqueous uranyl nitrate into uranium dioxide. The process is performed in a reaction chamber and the conversion into dioxide takes place in a single stage. The flame is produced in a burner, placed at the top of the reaction chamber and results from the incomplete combustion of a gaseous hydrocarbon such as propane. It propagates into the reaction chamber. A supply device traverses the burner in the axis of the flame in order to lead into the reaction chamber and atomize the uranyl nitrate in the flame. The uranyl nitrate is only admitted when the temperature at the bottom of the reactor (i.e. at its outlet) reaches 982° C. (1800° F.). The very simple apparatus would appear to be attractive, but the practical development must have been difficult, because the tests do not appear to have extended beyond the experimental stage in a pilot workshop. An article referring to this patent and entitled "Production of Uranium Dioxide by Flame Denitration", by W. H. Hedley, R. J. Roehrs and W. T. Trask Jr, published a few years later in I+EC Process Design and Development, vol. 3, No. 1, January 1964, mentions that supplementary work is necessary in order to solve various problems, including the presence of the oxide $U_3O_8$ in the resulting product.

In a completely different field, the Vicarb company has developed processes using two main phases, namely a gaseous phase on the one hand occupying a large volume and easily having a high thermomechanical energy, and on the other a dense phase, which is generally a liquid phase and of small volume. Instead of atomizing the liquid phase in the gas and independently thereof, as in conventional atomizers and burners, the thermal and mechanical energy supplied by the gaseous phase is brought into the form of a symmetrical turbulent flow in order to bring about the same result. The trajectories of the elementary mixtures (one elementary mixture being constituted by a liquid droplet and the gas surrounding it) resulting therefrom, during the first instance of the "flash contact" constitute the generatrixes of a hyperboloid of one sheet, divergent trajectories which do not intersect. The characteristic properties of this flash contact zone can be grouped under the name Isoflash effect.

A first device for applying this process, marketed by Vicarb, has a chamber, where the Isoflash effect is used and a head for injecting reaction products. A vertical pipe makes it possible to inject the liquid phase at the chamber inlet. Around said vertical pipe is provided a perforated basket having a single tangential inlet for the gaseous phase. The perforations of the basket constitute, within the injection head, a large number of regularly distributed, elementary, tangential inlets forming an isodistribution system of the injected hot gas. This perforated basket leads to the inlet of the chamber, where the flash contact zone between the two phases starts. The flash contact is then very fast (a fraction of a second).

A second device has been designed by Vicarb. In order to avoid hot walls, all the walls are cooled, the head being supplied with cold air and has a ring supplied with combustible gas. The combustion of this gas takes place entirely within the injection head, which serves as a burner. The resulting combustion gases penetrate the chamber in a symmetrical turbulent flow in order to bring about the flash contact with the liquid phase.

In these devices, all the physical phenomena taking place in approximately one thousandth of a second within the "donor-recipient" pair for thermomechanical energy more particularly consist of the creation and discharge of a microdroplet, impact by kinetic energy transfer, inherent vibration, rotation, etc. all effects leading to a doping of the mass and heat transfer and a flash vaporization, whose local endothermic effect protects the resulting dry product. For example, the combustion gases can lose 1000° C. over a distance of 30 cm and the dense phase can be heated by 60°. These devices are particularly suitable for the drying of agroalimentary and pharmaceutical products. They make it possible to obtain a very fine powder and bring about no deterioration of the biological products.

The inventors considered using the Isoflash effect for the preparation of uranium trioxide, although the technical field is very remote from the drying of agroalimentary or pharmaceutical products.

The research carried out by the applicant on denitration has shown, as stated hereinbefore, that the uranyl nitrate dehydration and calcination stages must normally be performed very carefully if a reactive structure is desired. Thus, the idea of the applicant was to use one of the aforementioned Vicarb devices for dehydrating hexahydrated uranyl nitrate before calcining it by another method. After experiments, the inventors then found that not only the dehydration took place correctly, but they could also carry out the conversion into uranium trioxide during the same operation and that this trioxide was very reactive. In view of the conditions inherent in the Isoflash effect, it would appear that the redissolving of the uranium trioxide in its crystal water (with destruction of the active structure) cannot take place during the key end of dehydration stage. The kinetics of this redissolving are too slow for this to take place.

The research carried out on a pilot device did not prove to be entirely conclusive, the oxide $UO_3$ obtained being at least as reactive as that produced by the solution requiring precipitation of the ammonium diuranate.

The invention therefore relates to a process for obtaining uranium trioxide from a uranyl nitrate solution, the trioxide obtained having to have a specific surface between 12 and 15 $m^2/g$, consisting of performing in a reaction chamber zone known as the contact zone, a thermomechanical contact between the uranyl nitrate solution atomized into fine droplets along a given axis in the contact zone, and a gaseous fluid introduced into the contact zone, the gaseous fluid being at a sufficiently high temperature and having a sufficiently high mechanical energy to bring about, in the contact zone, the dehydration and calcination of the uranyl nitrate.

Research revealed that the process functions for solutions having a uranyl nitrate concentration between 350 and 1200 g/l.

Advantageously, the gaseous fluid is introduced into the contact zone in the form of a turbulent flow around said uranyl nitrate solution atomization axis.

The gaseous fluid can be constituted by combustion gases, e.g. the gases resulting from the combustion of a gaseous hydrocarbon and air.

BRIEF DESCRIPTION OF THE DRAWINGS

The invention is described in greater detail hereinafter relative to non-limitative embodiments and with reference to the attached drawings, wherein show.

In exemplified manner, the remainder of the description will relate to a uranyl nitrate solution constituted by hexahydrated uranyl nitrate or uranyl nitrate hexahydrate.

According to the invention, thermal decomposition takes place of the hexahydrated uranyl nitrate into uranium trioxide in the following way:

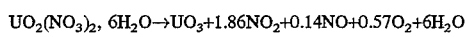

$$UO_2(NO_3)_2, 6H_2O \rightarrow UO_3 + 1.86NO_2 + 0.14NO + 0.57O_2 + 6H_2O$$

The heat necessary for the reaction can e.g. be supplied through the combustion of propane and air:

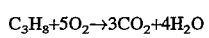

$$C_3H_8 + 5O_2 \rightarrow 3CO_2 + 4H_2O$$

Figure 1:
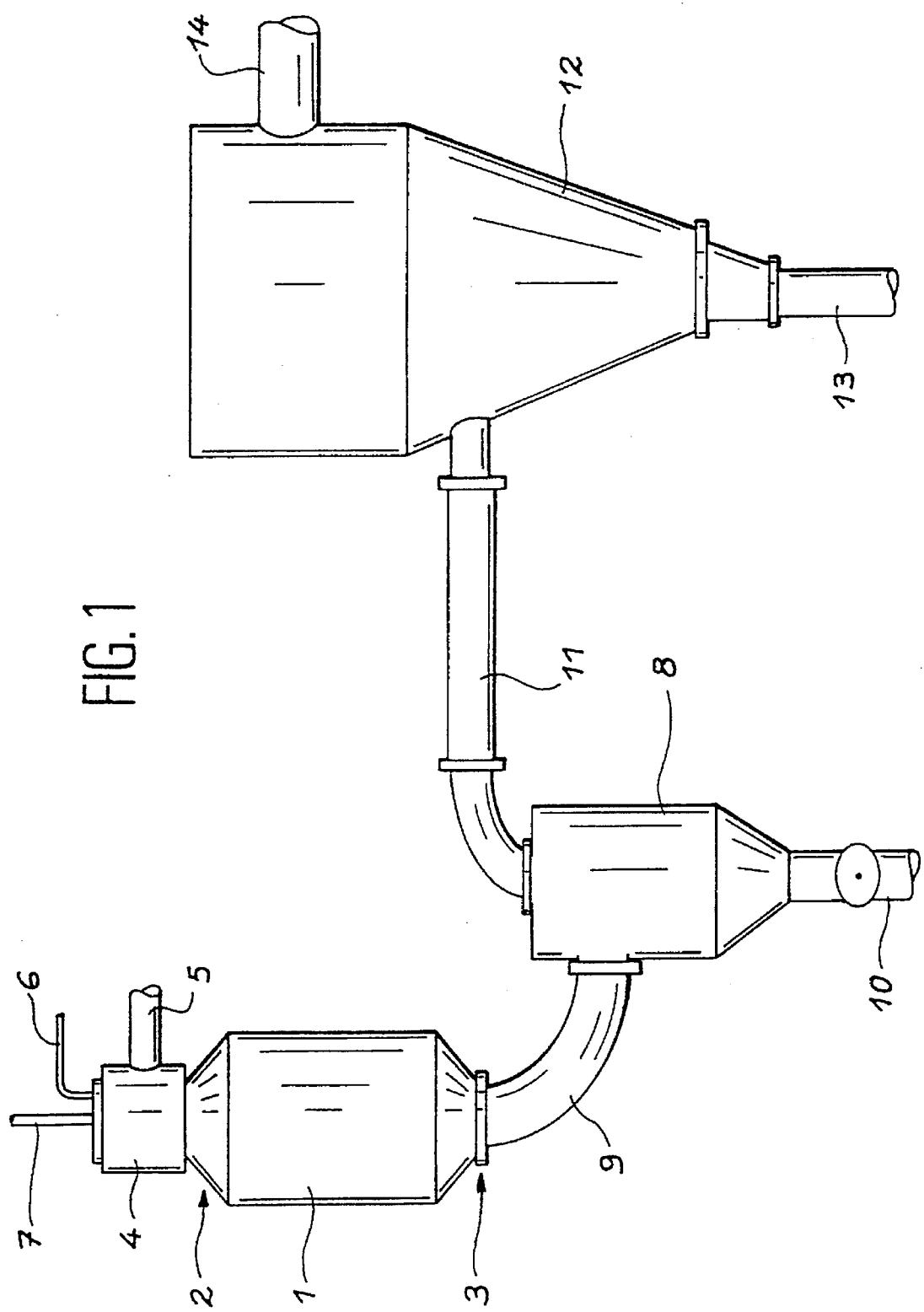
FIG. 1 a device making it possible to perform the process according to the invention of obtaining uranium trioxide by direct thermal denitration of uranyl nitrate.

The device shown in FIG. 1 comprises a reaction chamber 1 defined by a cylindrical envelope extended at each end by a cone reducing the inlet 2 and outlet 3 sections of the reaction chamber. The inlet 2 is connected to a burner 4 supplied with air by the duct 5 and with combustible gas by the duct 6. A duct 7 makes it possible to supply the hexahydrated uranyl nitrate to the reaction chamber 1.

The outlet 3 of the reaction chamber 1 is connected to a cyclone 8 by means of a pipe 9. The largest $UO_3$ particles formed are recovered by the pipe 10 connected to the bottom outlet of the cyclone 8. The fine particles are passed by gas vents at the top of the cyclone and supplied by means of the pipe 11 to a bag filter 12. The fine particles are recovered by the pipe 13. The dust-removed gases are sucked up by a fan located at the filter outlet using a pipe 14.

Figure 2:
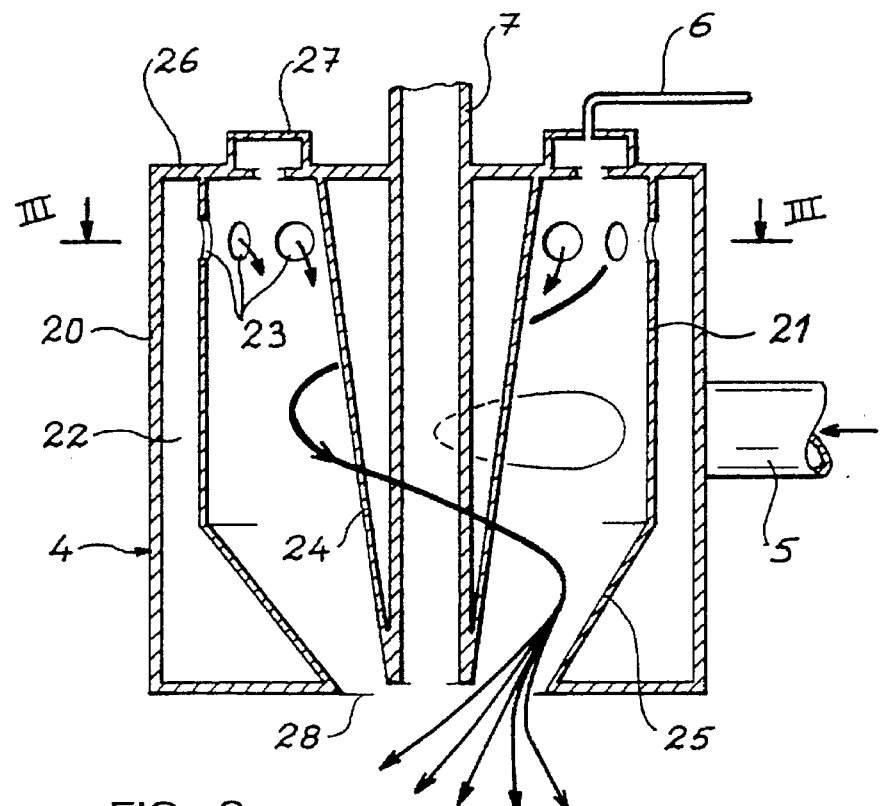
FIG. 2 a sectional, detail view of an element of the device shown in FIG. 1.
Figure 3:
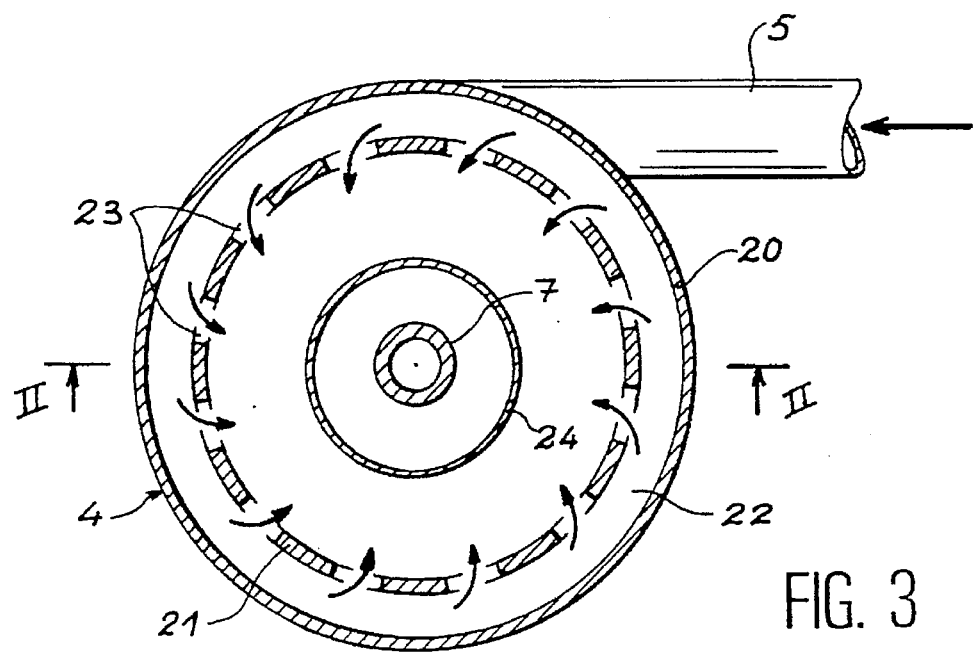
FIG. 3 a sectional view along the axis III—III of FIG. 2.

FIGS. 2 and 3 show the construction of the burner 4. All the burner walls are cooled by a not shown, water circulation. The burner has a cylindrical outer envelope 20 sealed in its upper part and having in its lower part an opening 28 communicating with the inlet 2 of the reaction chamber 1 (cf. FIG. 1). It also has an internal envelope or basket 21 defining an annular space 22 with the outer envelope. The basket 21 is perforated in the upper part by a row of holes 23 passing all round the basket. The duct 5 communicates tangentially with the annular space 22.

The duct 7 traverses the burner and leads to its opening 28, i.e. to the reaction chamber inlet. A downwardly pointed truncated cone 24 connects the upper part of the envelope 20 to the end of the duct 7 located in the opening 28. Together with the part 25 shaped like a nozzle of the inner envelope 21, it contributes to giving the desired movement to the combustion gases. The upper face 26 of the outer envelope 20 has a combustible gas supply ring 27, the duct 6 issuing at the bottom of said ring.

A description will now be given of a method for preparing uranium trioxide from hexahydrated uranyl nitrate using the process according to the invention and the device described relative to FIGS. 1 to 3.

The hexahydrated uranyl nitrate is contained in a thermally insulated tank, where it is kept stirred. Its melting point is equal to 65° C. and the tank is heated by an internal coil which can be supplied with cooled water or steam. The hexahydrated uranyl nitrate is prepared in the following way: uranium concentration around 1200 g/l, density about 2,400 kg/m³ and temperature approximately 80° C. The density of the solution is controlled by a densimeter. A demineralized water supply is possible to the tank in order to dilute the solution, if the density is too high. All the pipes for supplying the nitrate to the burner are thermally insulated and traversed by steam to prevent crystallization of the nitrate.

The combustible gas used can be propane supplying the burner under a pressure of approximately 1.4 bar. The air is supplied by booster pump at a pressure between 0.3 and 0.6 bar relative.

The burner ensures the combustion of the propane (approximately 5 kg/h) in the boosted air (approximately 150 kg/h) by the excitation of a not shown ignition plug. Combustion entirely takes place within the burner, so that the injected uranyl nitrate is never in contact with the flame. As shown by the arrows in FIGS. 2 and 3, the air injected into the burner is given a turbulent movement, which is due to the particular geometry of the burner, namely tangential air supply, presence of a perforated basket and conical shape of certain elements. This movement acquired by the air is also given to the combustible gas and to the combustion gases escaping through the outlet 28 and entering the reaction chamber. The gases resulting from the combustion and at a temperature of approximately 1400° C. are accelerated in the burner to reach a velocity of approximately 300 m/s in the upper, conical part of the reaction chamber 1, which is the reaction zone. The part of the duct 7 within the burner is cooled with pressurized water at a flow rate of approximately 1.5 m³/h. Thus, the temperature of the cooling water rises from 25° C. to 32° C. on traversing the burner.

In the reaction chamber, also known as a bicone, contacting takes place between the hot combustion gases and the hexahydrated uranyl nitrate. The nitrate is atomized into fine droplets at the top of the bicone and the reaction takes place as soon as contacting occurs with the gases. The remaining volume of the bicone permits the evaporation of the water and the formation of $UO_3$ particles.

The speed of the motor of the volumetric pump used for injecting the nitrate is dependent on the internal temperature at the bottom of the bicone. At this level the temperature is between 350° and 500° C. It is the temperature rise of the hot gases during ignition which starts up the pump.

The largest $UO_3$ particles formed are recovered by cycloning at the outlet of the bicone. The fine particles are passed by the pipe 11 to the bag filter 12. The maximum temperature of the solid-containing gases, which is permitted for the bags is 140° C., so that the gas vents at the top of the cyclone 8 are cooled with air (approximately 300 kg/hour of air). The dust-removed gases sucked at the outlet of the filter 12 are treated in means where the nitrous vapours are washed with water and neutralized in soda.

We claim:

1. Process for obtaining uranium trioxide from a uranyl nitrate solution, the trioxide obtained having to have a specific surface between 12 and 15 m²/g, consisting of performing in a zone of a reaction chamber (1), called the contact zone, a thermomechanical contact between the uranyl nitrate solution, atomized into fine droplets along a given axis in the contact zone, and a gaseous fluid introduced into the contact zone, the gaseous fluid being at a sufficiently high temperature and having a sufficiently high mechanical energy to carry out, in the contact zone, the dehydration and calcination of the uranyl nitrate.

2. Process according to claim 1, wherein said solution has a uranyl nitrate concentration between 350 and 1200 g/l.

3. Process according to claim 1, wherein said solution is constituted by hexahydrated uranyl nitrate.

4. Process according to claim 1, wherein the gaseous fluid is introduced into the contact zone in the form of a turbulent flow about said uranyl nitrate solution atomization axis.

5. Process according to claim 1, wherein the gaseous fluid is constituted by combustion gases.

6. Process according to claim 5, wherein the gaseous fluid is the product of a complete combustion.

7. Process according to claim 5, wherein the gaseous fluid is constituted from the gases resulting from the combustion of a gaseous hydrocarbon and air.

8. Process according to claim 7, wherein said hydrocarbon is propane.

9. Process according to any one of the preceding claims, wherein the supply of the reaction chamber with uranyl nitrate solution is dependent on the internal temperature prevailing in a zone of the reaction chamber different from the contact zone.

* * * * *